United States Patent [19]
Tokita

[11] Patent Number: 6,100,669
[45] Date of Patent: Aug. 8, 2000

[54] FULL-CHARGE DETECTING METHOD AND CHARGING DEVICE FOR A SECONDARY BATTERY

[75] Inventor: Yoshitaka Tokita, Yamagata, Japan

[73] Assignee: NEC Corporation, Tokyo, Japan

[21] Appl. No.: 09/228,927

[22] Filed: Jan. 12, 1999

[30]     Foreign Application Priority Data

Jan. 12, 1998  [JP]  Japan ................................. 10-004036

[51] Int. Cl.[7] ....................................................... H02J 7/00
[52] U.S. Cl. ...................... 320/149; 320/162; 324/427; 307/125
[58] Field of Search ..................................... 320/149, 162; 324/427, 428; 307/112, 116, 125, 131

[56]           References Cited

U.S. PATENT DOCUMENTS

| | | | |
|---|---|---|---|
| 5,382,893 | 1/1995 | Dehnel | 320/160 |
| 5,723,970 | 3/1998 | Bell | 320/140 |
| 5,739,667 | 4/1998 | Matsuda et al. | 320/128 |
| 5,786,682 | 7/1998 | Aiken et al. | 320/136 |
| 5,789,904 | 8/1998 | Faulk et al. | 320/162 |
| 5,898,234 | 4/1999 | Kitagawa | 307/48 |

*Primary Examiner*—Peter S. Wong
*Assistant Examiner*—Gregory J. Toatley, Jr.
*Attorney, Agent, or Firm*—Sughrue, Mion, Zinn, Macpeak & Seas, PLLC

[57]            ABSTRACT

A method of detecting the full-condition of a secondary battery of the present invention integrates the amount of charge current with a microcomputer in an environment of the kind causing a charge current to vary. When the charge current falls, the method interrupts a charging operation until an adequate charge current flows. A charging device for practicing the above method is also disclosed.

7 Claims, 2 Drawing Sheets

FULL-CHARGE DETECTING METHOD AND CHARGING DEVICE FOR A SECONDARY BATTERY

BACKGROUND OF THE INVENTION

The present invention relates to a method of detecting, in an environment of the kind causing a charge current to vary, the full-charge condition of a secondary battery by integrating the amount of charge current with a microcomputer, and a charging device for practicing the same.

It has been customary with a secondary battery to detect a full-charge condition on the basis of the drop of a battery voltage by Δ V or an integrated amount of charge detected by a microcomputer. The integrated amount of charge is used in an environment of the kind causing the charge current to vary.

Japanese Patent Laid-Open Publication No. 8-98425, for example, teaches a charging system determining the full-charge condition of a secondary battery on the basis of the voltage of a charging power source. With this charging system, it is possible to insure required voltage accuracy even when the voltage of the power source is not accurately adjusted.

Japanese Patent Laid-Open Publication No. 7-99738 discloses a charging method to be practiced when a constant charge current flows. Specifically, when battery temperature rises above a preselected threshold during rapid charging needing a great current, a charge current is fed in the form of pulses. This, coupled with an endothermic reaction particular to a nickel-hydrogen battery and occurring during discharge, causes partial discharge to occur and thereby reduces the elevation of battery temperature. Such a method prevents the charging efficiency from falling when temperature is high, thereby promoting sure charging.

However, it is difficult with any one of the conventional methods to integrate the charge current when the charge current varies irregularly, particularly when it falls. This obstructs the accurate detection of a full-charge condition. The problem with secondary batteries in general is that a charge capacity input to a battery varies in accordance with the size of a charge current, battery temperature, and a difference between the current charge condition and the full-charge condition. The variation of the charge capacity is extremely difficult to grasp as an integrated amount of current. Particularly, when a charge current is short due to high temperature, the charging efficiency noticeably falls and makes it extremely complicated and difficult to accurately calculate the amount of current actually input to a battery by integration. As a result, it is likely that overcharge occurs or that a condition short of a full-charge condition is determined to be a full-charge condition.

Technologies relating to the present invention are also disclosed in, e.g., Japanese Patent Laid-Open Publication No. 4-87528

SUMMARY OF THE INVENTION

It is therefore an object of the present invention to provide a method capable of easily detecting the full-charge condition of a secondary battery by integration while enhancing the reliability of the battery, and a charging device for practicing the same.

In accordance with the present invention, in a method of charging a secondary battery in a condition of the kind causing a charge current to vary, a charging operation is interrupted when the charge current decreases, until an adequate charge current flows.

BRIEF DESCRIPTION OF THE DRAWINGS

The above and other objects, features and advantages of the present invention will become more apparent from the following detailed description taken with the accompanying drawings in which.

DESCRIPTION OF THE PREFERRED EMBODIMENT

Figure 1:
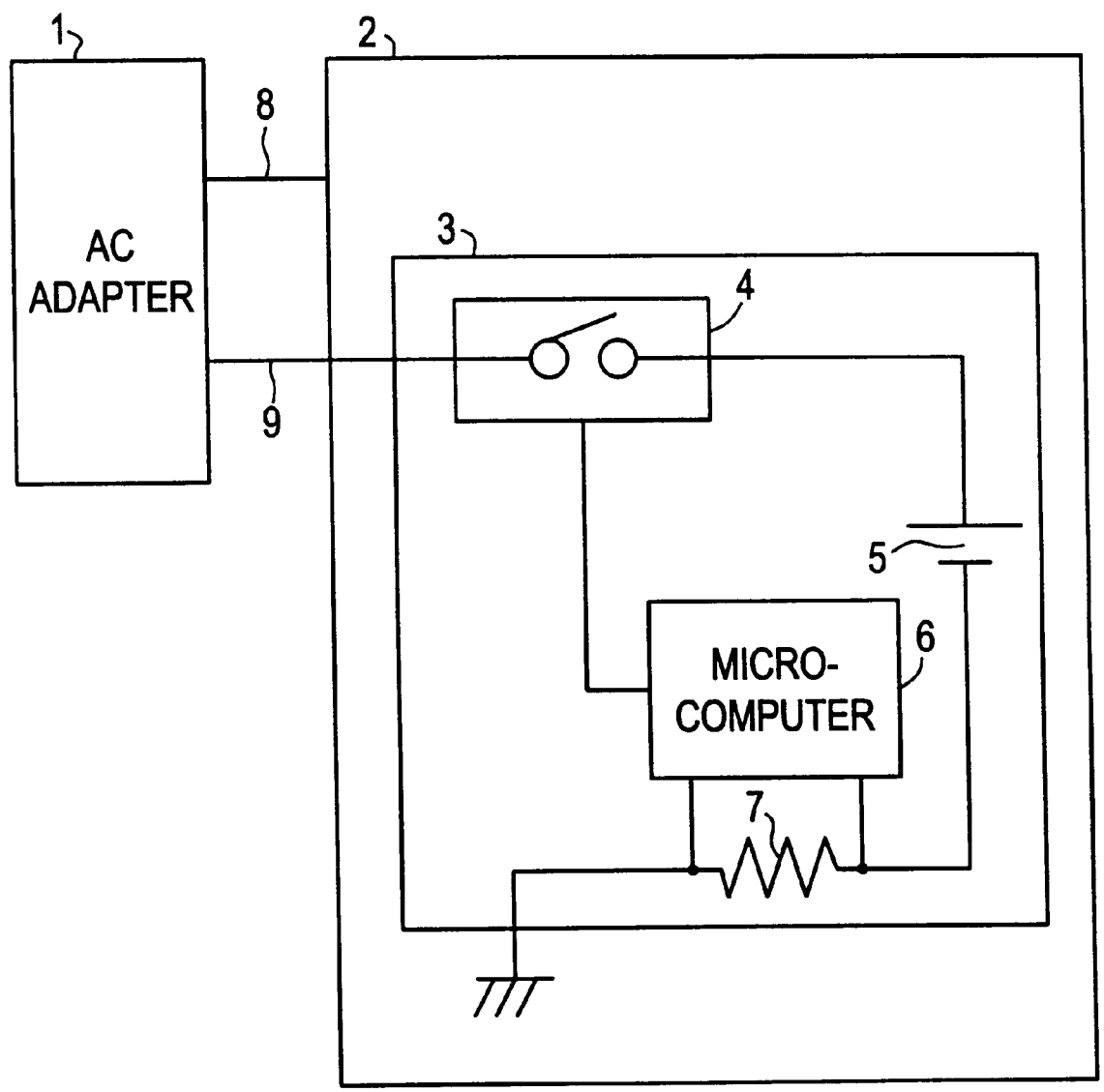
FIG. 1 is a block diagram schematically showing a charging device embodying the present invention.

Referring to FIG. 1 of the drawings, a charging device for a secondary battery embodying the present invention is shown. As shown, the charging device includes an AC adapter 1 for feeding AC power, a handy personal computer 2, a battery pack 3 with a charging circuit arranged therein, a power feed line 8 via which the adapter 1 feeds power to the personal computer 2, and a charge power feed line 9 via which the adapter 1 feeds charge power to the battery pack 3. The battery pack 3 includes a switch 4 for selectively turning on or turning off a charge current, a microcomputer 6 for controlling charging, and a resistor 7 for sensing a current.

The switch 4 selectively turns on or turns off a charge current fed from the AD adapter 1. The microcomputer 6 stores beforehand a minimum charge current that can be adequately integrated. When a charge current being sensed by the resistor 7 is below the above minimum charge current, the microcomputer 6 turns off the switch 4 and again turns it on the elapse of a preselected period of time. A secondary battery 5 to be charged by the charging device is a nickel-hydrogen battery.

The personal computer 2 receives power from the AC adapter 1 via the power feed line 8. While the personal computer 2 is in operation, the battery pack 3 charges the secondary battery 5 with a charge current being fed thereto from the AC adapter 1 via the charge power feed line 9.

The charge current to be fed to the battery pack 3 via the charge power line 9 is determined by a difference between the maximum power that the AC adapter 1 can feed and the operating power of the personal computer 2. It follows that the charge current decreases when the power input to the personal computer 2 is great or increases when the above power is small. In this manner, the charge current input to the battery pack 3 is unstable, i.e., varies irregularly, depending on the condition of use of the personal computer 2.

In the illustrative embodiment, a minimum charge current that can be adequately integrated during the charging of the battery 5 is stored in the microcomputer 6 beforehand. The resistor 7 constantly senses the charge current. When the charge current being sensed by the resistor 7 falls below the minimum charge current stored in the microcomputer 6, the microcomputer 6 turns off the switch 4 in order to interrupt the charging operation. Then, on the elapse of a preselected period of time, the microcomputer 6 again turns on the switch 4 for resuming the charging operation. The microcomputer 6 repeatedly executes such a procedure. As a result, the integration of the amount of charge current is interrupted when the minimum charge current capable of being adequately integrated is not available.

Figure 2:
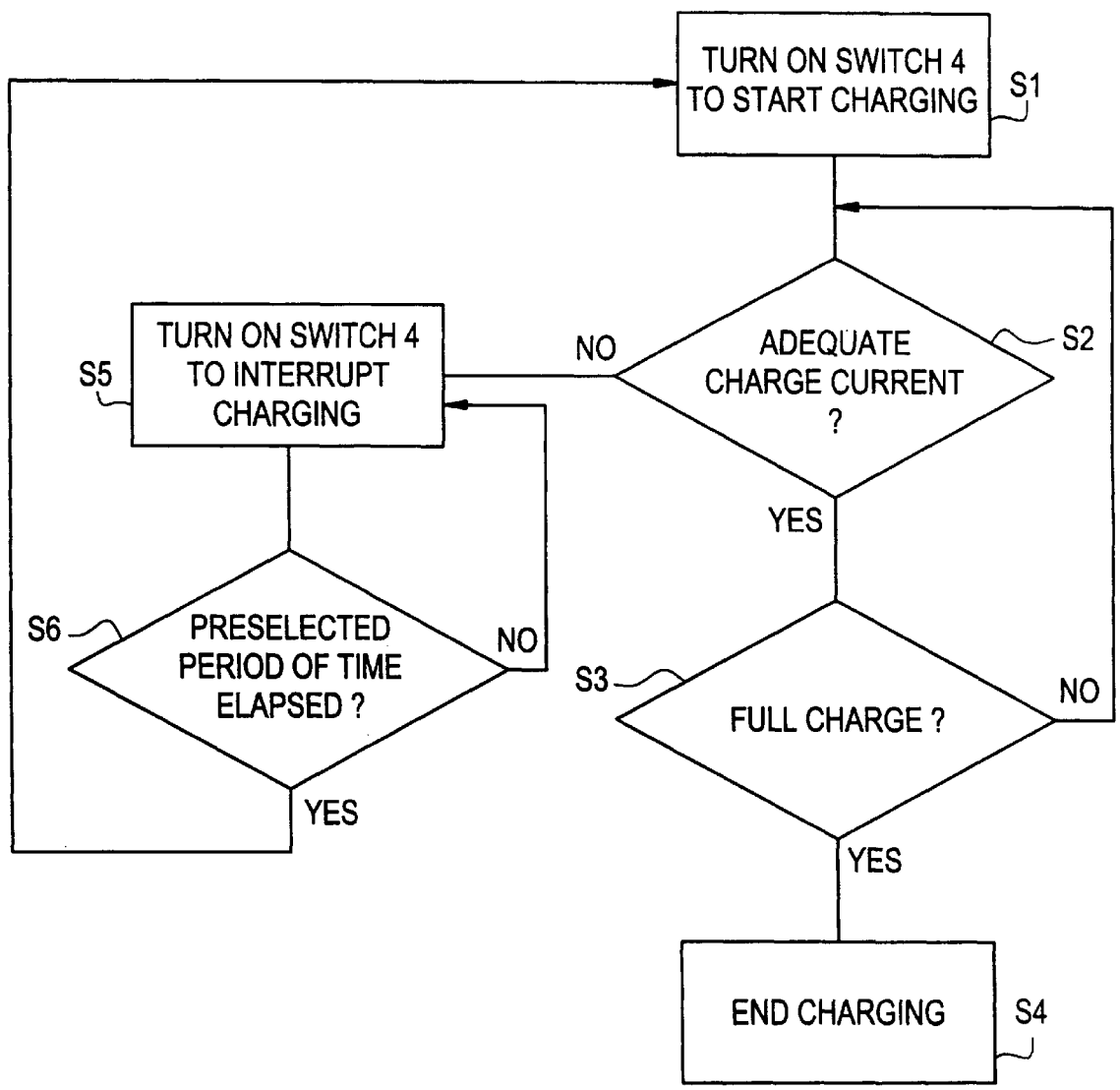
FIG. 2 is a flowchart demonstrating a specific operation of the charging device shown in FIG. 1.

Reference will be made to FIG. 2 for describing a specific operation of the illustrative embodiment. As shown, when the AC adapter 1 feeds power to the personal computer 2 via the power feed line 8 and feeds a charge current to the battery pack 3 via the charge power feed line 9, the microcomputer 6 turns on the switch 4 in order to cause the battery pack 3 to start charging the battery 5 (step S1). Then, the microcomputer 6 determines whether or not the charge current being sensed by the resistor 7 is adequate (step S2). If the current is adequate (Yes, step S2), then the microcomputer 6 determines whether or not the battery 5 has been fully charged (step S3). If the answer of the step S3 is Yes, then the microcomputer 6 causes the battery pack 3 to end the charging operation (step S4). However, if the battery 5 has not been fully charged (No, step S3), then the program returns to the step S2. On the other hand, if the answer of the step S2 is No, then the microcomputer 6 turns off the switch 4 in order to interrupt the charging operation of the battery pack 3 (step S5) and waits until a preselected period of time elapses (step S6). On the elapse of the preselected period of time (Yes, step S6), the microcomputer 6 again turns on the switch 4 so as to cause the battery pack 3 to charge the battery 5 (step S1).

In summary, in accordance with the present invention, a particular charge current is stored in a microcomputer and insures an adequate charge current even the charge current varies irregularly. This promotes the easy detection of a full-charge condition.

Various modifications will become possible for those skilled in the art after receiving the teachings of the present disclosure without departing form the scope thereof. For example, the personal computer shown and described may be replaced with any other suitable handy electronic apparatus.

What is claimed is:

1. In a method of charging a secondary battery comprising:

detecting when a charge current decreases below a current level that is able to be integrated, interrupting a charging operation in response to the detection of the charge current decreasing below said current level that is able to be integrated until, a charge current which is able to be integrated flows.

2. In a method of detecting a full-charge condition of a secondary battery by integrating an amount of charge current, comprising:

interrupting a charging operation when the charge current falls below a current level which is able to be integrated until a charge current that is able to be integrated flows.

3. In a method of detecting a full-charge condition of a secondary battery by integrating an amount of charge current with a microcomputer, said method comprising the steps of:

using said microcomputer to set a minimum charge current which is able to be integrated;

interrupting a charging operation when said microcomputer detects that the charge current is smaller than said minimum charge current;

resuming the charging operation after a preselected period of time; and repeating said detection, said interruption, and said resumption of the charging operation until the secondary battery has been fully charged.

4. In a charging device for detecting a full-charge condition of a secondary battery by integrating an amount of charge current comprising:

a current interrupter interrupting a charging operation when the charge current falls below a current level which is able to be integrated, until a charge current that is able to be integrated flows.

5. A charging device as claimed in claim 4, wherein said charging device is applied to a handy electronic apparatus.

6. In a charging device for detecting a full-charge condition of a secondary battery by integrating an amount of charge current with comprising:

a microcomputer having leads connected to a resistor, said microcomputer programmed to detect said amount of charge current through said resistor;

a switch for selectively turning on or turning off the charge current being fed from a charge power feeding device;

said microcomputer having stored therein a value of a minimum charge current that is able to be integrated for turning off said switch, when a value of the charge current being sensed by said resistor is below said value of said minimum charge current, and again turning on said switch after an elapse of a preselected period of time.

7. A charging device as claimed in claim 6, wherein said charging device is applied to a handy electronic apparatus.

* * * * *